J. H. BURTON.
MANUFACTURE OF GUN BARRELS.
No. 27,539. Patented Mar. 20, 1860.
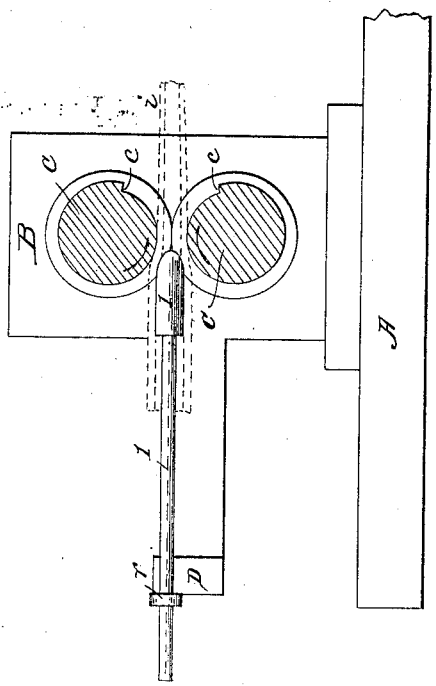
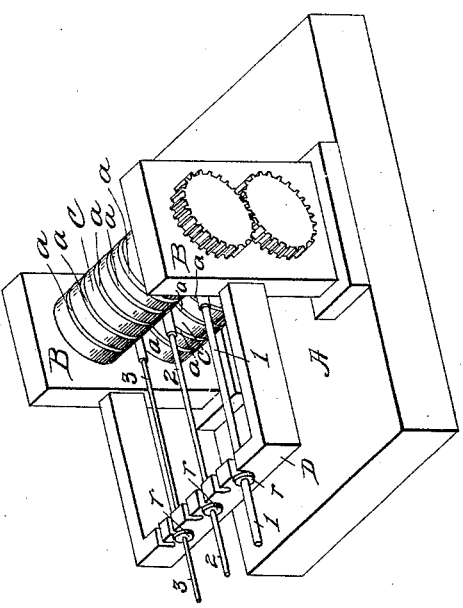
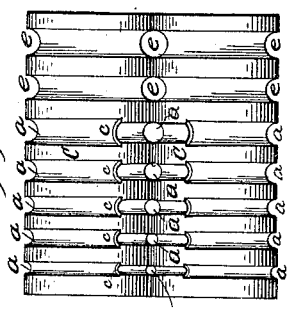
Witnesses:
Inventor:
James Henry Burton
per N. B. Stoughton, Atty.

UNITED STATES PATENT OFFICE.

JAMES HENRY BURTON, OF JEFFERSON COUNTY, VIRGINIA.

IMPROVEMENT IN THE MANUFACTURE OF GUN-BARRELS.

Specification forming part of Letters Patent No. 27,539, dated March 20, 1860.

*To all whom it may concern:*

Be it known that I, JAMES HENRY BURTON, of Jefferson county, in the State of Virginia, now residing at Enfield Lock, in England, have invented certain new and useful Improvements in the Manufacture of Gun-Barrels; and I do hereby declare that the following is a full, clear, and exact description of the construction and operation of the same.

The nature of my invention consists in the process of constructing a barrel of steel or iron of a uniform bore and exterior taper without welding. The paramount obstacles in the way of making such gun-barrels without welding has been the expense and difficulty attendant upon drilling a hole of equal diameter and concentric with the exterior through its entire length. To avoid these, many modes have been suggested, none of which up to the present time have to my knowledge been sufficiently economical to enter into general use. Steel has been cast into the form of tubular cylinders, then hammered for the purpose of closing the pores, and finally elongated by rolling or hammering, or partly by both, always with a mandrel within them. Another plan was, as in the previous process, to cast the steel into a tubular form. It was then elongated by hammering on a mandrel, or by means of grooved rollers moving or rolling the hot steel tube over a fixed mandrel, as in the well-known process of welding iron tubes by grooved rollers, or on taper mandrels, such as are used when drawing or rolling brass tubes, &c. A third was to drill the hole through the whole or part of the length of a short cylinder or bar, which was then forced through plates with graduated holes or passed through rollers as used in the old process of rolling iron, but without the use of mandrels, unless the bore was to be polygonal with longitudinal flutes or other unusual shape, until the required length was attained. These and others, I believe, have never proved of practical value. My invention claims to remedy the defects of former processes, to overcome the obstacles above mentioned, to construct the barrel without the risk of defective welding, and with facility, economy, and accuracy.

The operation is as follows: Taking a short solid cylindrical bar of hammered or rolled steel (or iron) of the proper dimensions and weight, I slightly anneal it. Through the center of its entire length a hole of sufficient size to allow for the proper contraction when the cylinder is elongated is then drilled, and the piece is heated to the degree required in rolling steel. As the necessity for a welding heat is by this mode obviated, the temper and strength of the steel are more perfectly preserved. In this state it is subjected as often as required to the action of corresponding taper grooves on the peripheries of a pair of rollers which contain a graduated series of them, to be used, if required, in succession. The cylinder is then presented to these rolls upon "fixed mandrels," (so called,) the series of which is likewise graduated, and by them the size of the hole reduced in the elongation is determined. This last part of the process is the same or substantially the same plan now known and employed in rolling and welding iron gun-barrels. By these operations the desired length of barrel is obtained, the proper taper form is imparted to its exterior, and the interior or bore is of a reduced uniform diameter. The barrel is then bored, turned, and finished in the usual way.

To enable others skilled in the art to make and use my invention, I will proceed to describe the same in connection with the accompanying drawings, in which—

Figure 1 represents in perspective a set of grooved rolls and the mandrels connected therewith. Fig. 2 represents a vertical longitudinal section through the frame, rolls, &c. Fig. 3 represents a front view of the rolls, showing their tapering grooves; and Figs. 4 and 5 represent, respectively, a side view and section of the cylinder or block and of the rolled-out barrel, showing their comparative diameter-bore and length in the cylinder and in the rolled-out state.

Similar letters of reference, where they occur in the separate figures, denote like parts of the mechanism in all of them.

A is a bed, upon which are mounted pillar-blocks B B for sustaining two grooved rollers C C, that are geared together so as to be revolved together by any first-moving power. These rolls are furnished with a series of grooves *a a* of variable sizes, but all tapering in the line of their windings around the rolls, as shown at the points *c c* of Fig. 3. The grooves *e e* are simply preparatory or reducing grooves and need not be made tapering.

1 2 3 represent a series of mandrels of graduated sizes, each one of the size suitable for the special pass or groove of the rolls that it is to work with, the series of grooves and mandrels gradually diminishing in diameter, so that each pass through between the rolls shall not only diminish the diameter of the cylinder, but diminish its bore also, and in drawing out the cylinder it is tapered also by the tapering form of the grooves $a\ a$.

The operation is as follows: A cylinder $i$, of iron or steel of suitable length, is first prepared by drilling a hole $m$ through it, the end of the cylinder being rounded somewhat to freely enter between the rolls or easily take the grooves. The cylinder so prepared and properly heated or annealed is first drawn out or rolled from the mandrel 1, which is somewhat smaller in diameter than the bore of the cylinder, which reduces and at the same time elongates the cylinder in a tapered form. The bore of the cylinder is also reduced in size. It is next subjected to a similar operation over the mandrel 2, smaller than the first, which shell further elongates and reduces both the cylinder and its bore, and so again over mandrel 3, and succeeding similar operations, if necessary, until the barrel is drawn out, as shown in Fig. 5, with a bore reduced, as shown at $n$ in the section, Fig. 5. Of course the number of grooves and passes will vary with the extent of drawing out or reducing that the cylinder is to undergo and the length of the barrels to be made. The barrels thus rolled out and formed must of course have the bore trued up; but they will be found to be well shaped and true in a general line, requiring of course, finishing up, and far superior to welded barrels. By properly shaping the grooves around the rolls the necessary tapering form may be given to the barrels. The bar D is furnished with rests or supports in which the mandrels are placed to keep them in line with their grooves, and a collar $r$ on the mandrels prevents them from being drawn into the rolls.

The arrows in Fig. 2 show the direction in which the rolls turn.

Having thus fully described my invention and the manner in which it is operated, what I claim as new, and desire to secure by Letters Patent, is—

The making of gun-barrels by drawing them down from a cylinder between grooved rolls and over graduated mandrels, so that they shall not only be reduced in diameter and in the size of the bore at each successive pass, but also tapered externally, substantially as set forth.

JAMES HENRY BURTON.

Witnesses:
 JOHN T. PITMAN,
  67 *Gracechurch St.*
 T. P. CAPP.